Figure 3:
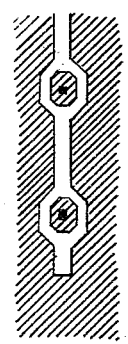
Figure 4:
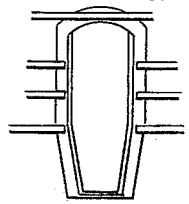
Figure 5:
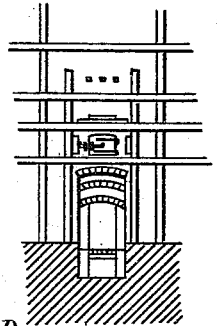
Figure 2:
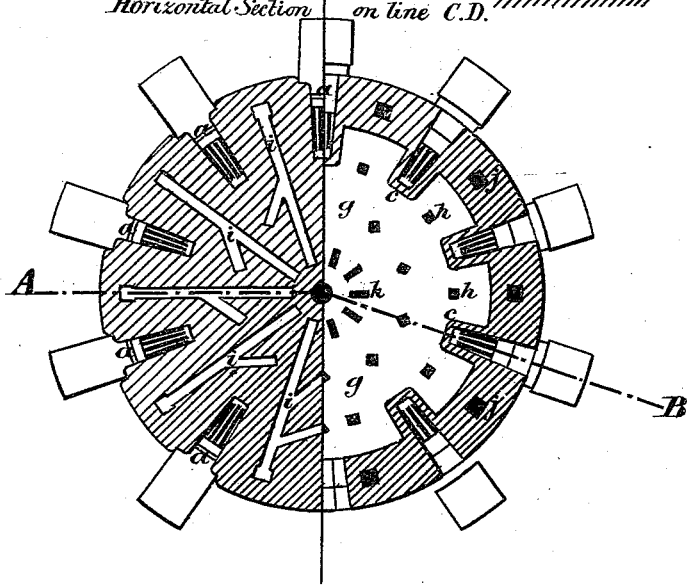

combination of the clips $c$, rear axle, and clamping-screws $w$ $w$, substantially as and for the purposes described.

7. In a carriage for portable engines, the brackets $b$, provided with the tubular arms $b'$, in combination with the pintles $n$, set-screws $t$, and carriage-springs, substantially as and for the purpose described.

8. In a carriage for portable engines, the combination of the carriage-springs, axle, and a locking device to lock the springs at will and prevent them from operating, substantially as described.

9. In a carriage for portable engines, the combination of the draft-wheels and axle with a locking device to lock the wheels to the axle, substantially as described.

10. In a carriage for portable engines, the combination of an arching reach, with the forward wheels adapted to swing under the reach, and with a locking device by which either forward wheel can be locked to the reach to support the latter and keep the wheels from moving, substantially as described.

CASSIUS M. MILLER.

Witnesses:
E. S. KARNER,
M. CHURCH.

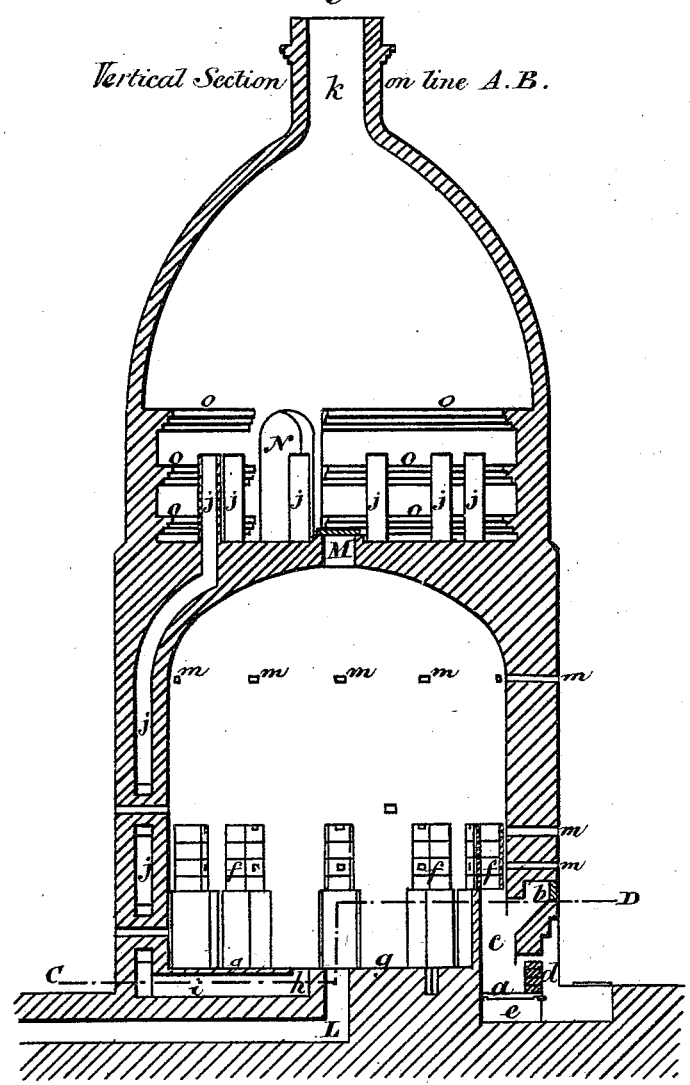

2 Sheets--Sheet 2.

T. W. MINTON.
Ovens for Firing Pottery.

No. 165,855. Patented July 20, 1875.

Vertical section of upright flues showing how they are constructed for the passage of trial holes.

Front of door.

Front of one of the Mouths.

Horizontal Section on line C.D.

Attest:
Joe S. Peyton,
R. H. Moss

Inventor:
Thomas W. Minton
by his Atty
Wm. D. Baldwin

N. PETERS, PHOTO-LITHOGRAPHER, WASHINGTON, D. C.